United States Patent
Deak et al.

[11] Patent Number: 5,812,588
[45] Date of Patent: Sep. 22, 1998

[54] TEMPERATURE PROBE

[75] Inventors: Anton Deak, Nussbaumen; Caroline Marchmont, Tegerfelden, both of Switzerland; Ung-Lap Ngo-Beelmann, Karlsruhe, Germany

[73] Assignee: Asea Brown Boveri AG, Baden, Switzerland

[21] Appl. No.: 743,935

[22] Filed: Nov. 5, 1996

[30] Foreign Application Priority Data

Dec. 1, 1995 [DE] Germany .......... 195 44 880.4

[51] Int. Cl.$^6$ .............. G01K 7/02; H01L 35/02
[52] U.S. Cl. .......... 374/166; 374/179; 374/208; 136/230
[58] Field of Search .............. 374/137, 144, 374/147, 148, 166, 179, 208, 209; 136/230, 232

[56] References Cited

U.S. PATENT DOCUMENTS

| | | | |
|---|---|---|---|
| 2,820,839 | 1/1958 | Schunke | 374/148 |
| 2,888,508 | 5/1959 | Rademacher | 374/179 |
| 3,015,234 | 1/1962 | Springfield | 136/232 |
| 3,263,502 | 8/1966 | Springfield | 136/232 |
| 3,637,438 | 1/1972 | Springfield | 136/230 |
| 3,923,552 | 12/1975 | Parris | 374/208 |
| 4,572,677 | 2/1986 | Sehgal | 374/208 |
| 5,022,766 | 6/1991 | Phipps | 374/209 |
| 5,232,517 | 8/1993 | Hillborn et al. | 374/179 |
| 5,382,093 | 1/1995 | Dutcher | 374/179 |

FOREIGN PATENT DOCUMENTS

| | | |
|---|---|---|
| 0052466 | 5/1982 | European Pat. Off. . |
| 2062010 | 12/1971 | Germany . |
| 2509371 | 9/1975 | Germany . |
| 365896 | 1/1963 | Switzerland . |

*Primary Examiner*—G. Bradley Bennett
*Attorney, Agent, or Firm*—Burns, Doane, Swecker & Mathis, L.L.P.

[57] ABSTRACT

In a temperature probe, in particular for use in the waste-gas diffusor of a gas turbine, a probe tube (1) projecting into the hot-gas region of the waste-gas diffusor is provided with an inner bore running in the direction of the tube axis of the probe tube (1). At the same time, the probe tube (1) is provided over its length with a number of throughflow ducts running transversely relative to the tube axis and in which are located a number of thermocouples (22), the connecting points (23) of which are arranged in the throughflow ducts. The thermocouples (22) are connected to a compensating line (13) in a terminal box (14). Each thermocouple (22) is arranged in a solely heat-movably guided manner in a protective tube (18) which is fixed relative to the inner bore of the probe tube (1).

8 Claims, 2 Drawing Sheets

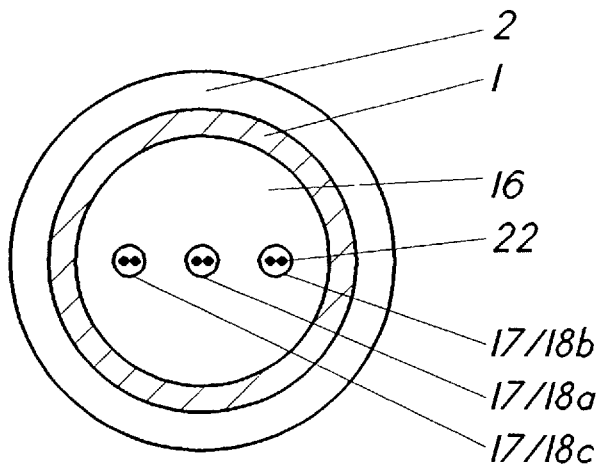
FIG. 2
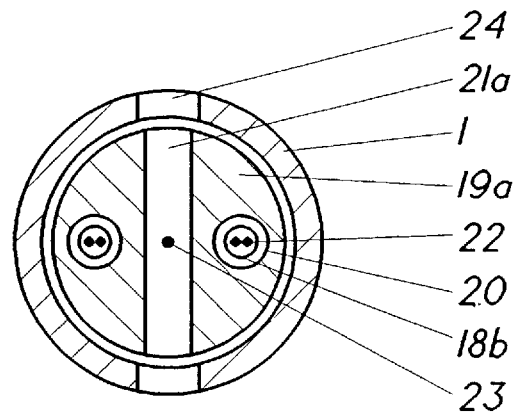
FIG. 3

TEMPERATURE PROBE

BACKGROUND OF THE INVENTION

1. Field of the Invention

The present invention relates to the field of temperature measurement technology. It relates to a temperature probe, such as is described in the preamble of the first claim.

2. Discussion of Background

Temperature probes of this type, in particular for use in the waste-gas diffusor of a gas turbine, are generally known. For this purpose, the temperature probes are inserted in corresponding orifices on the waste-gas diffusor of the turbine, whilst a probe tube, which contains the actual measuring elements, projects into the waste-gas stream. Here, a number of measuring elements are arranged in individual measuring spaces so as to be distributed over the length of the probe tube, and the temperature probe as a whole is rated for a typical waste-gas temperature of up to 800° C.

Each measuring space is designed as a throughflow duct which is oriented transversely relative to the probe tube axis and passes through the probe tube with clearance and at the center of which the connection point for an installed thermocouple is placed. In order to place thermocouples at specific locations in this way, they are fixed indirectly in the probe tube in each case in the vicinity of the associated throughflow duct. A conventional gastight probe tube bushing, by means of which a temperature probe is fastened to a waste-gas diffusor wall, constitutes a second fastening for thermocouples installed in this way.

Due to their coefficients of expansion, the probe tube and the thermocouple experience different thermal expansion. To avoid causing any mechanical stress on the thermocouple, the latter must have a loose compensating loop between the fixing in the vicinity of the throughflow duct and the gastight probe tube bushing. As a result, even when the probe tube undergoes thermal expansion, the thermocouple is to remain protected from mechanical stresses and the risk of fracture associated therewith.

However, a thermocouple is exposed not only to thermal influences, but also to mechanical vibrations of the plant system as a whole. These mechanical and thermal stresses, alone or in combination, may bring about the failure of a thermocouple.

If a failure of a thermocouple occurs, the complete temperature probe is removed and dismantled, and, after the defective thermocouple has been exchanged, the temperature probe is installed again. The outlay for a repair of this kind can amount to approximately 60% of the price of the temperature probe itself when new, which, in the light of economic factors, may make such a repair seem questionable.

SUMMARY OF THE INVENTION

Accordingly, one object of the invention is to develop further a temperature probe of the type initially mentioned, to the effect that the design of the temperature probe is simplified considerably and consequently, at the same time, access to a thermocouple installed in the temperature probe becomes so much easier that the exchange of a thermocouple can be carried out on a fitted temperature probe.

The advantages of the invention are to be seen, inter alia, in that, by virtue of the essentially guided arrangement of each thermocouple in a protective tube, the thermocouples remain completely independent of mechanical stresses which occur due to different thermal expansions of all the components which comprise a temperature probe and which have their specific coefficients of expansion. The risk of fracture of a thermocouple is thus decisively reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows a section through the temperature probe along the line II—II according to FIG. 1;

FIG. 3 shows a section through the temperature probe along the line III—III according to FIG. 1.

Figure 1:
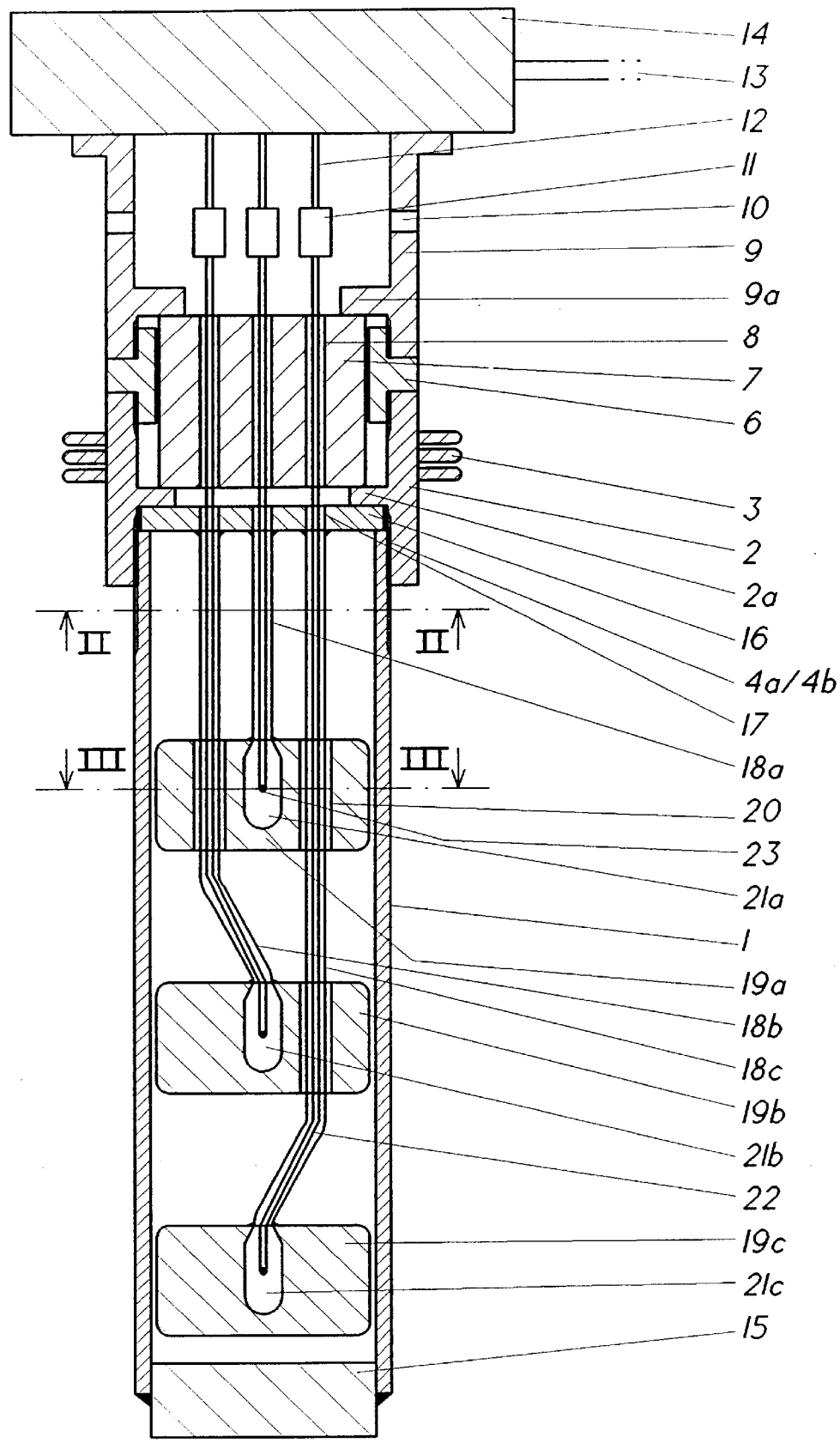
FIG. 1 shows the design of a temperature probe in longitudinal section.

Only the elements essential for understanding the invention are shown. For example, a generally known fastening of a temperature probe to the waste-gas diffusor of a gas turbine is not shown.

DESCRIPTION OF THE PREFERRED EMBODIMENTS

Referring now to the drawings, wherein like reference numerals designate identical or corresponding parts throughout the several views, in FIG. 1 is shown in longitudinal section a temperature probe, such as is used, for example, in a waste-gas diffusor, not shown here, of a gas turbine. In this case, a temperature probe of this type can be divided into two parts with regard to its installation.

A first part projects into the hot-gas region of the waste-gas diffusor and comprises essentially a probe tube 1 which is equipped with thermocouples 22 and which terminates at the lower end in a probe tube closure 15. A second part of the temperature probe is arranged outside the hot-gas space and comprises essentially a cooling tube 2 with cooling ribs 3, a tube bushing 6 with an inner sealing cylinder 7, and a terminal box 14 which is connected to the tube bushing 6 by means of an adapter 9.

The probe tube 1 has an inner bore in the direction of its tube axis, and, furthermore, the probe tube 1 is provided at its upper end with an external thread 4b. This external thread 4b engages in an internal thread 4a of the cooling tube 2, the internal thread 4a being cut as far as a radial contraction 2a inside the cooling tube 2. By screwing the probe tube 1 together with the cooling tube 2, a perforated disk 16 is braced between the upper end of the probe tube 1 and the radial contraction 2a within the cooling tube 2.

The perforated disk 16 has three bores 17, in alignment with which three protective tubes 18a,b,c are welded to the underside of the perforated disk 16.

This arrangement of the perforated disk 16 is illustrated once again in FIG. 2. The protective tubes 18a,b,c are connected to the perforated disk 16 concentrically relative to the bores 17 in the latter, the inside diameters of the protective tubes 18a,b,c being no smaller than those of the bores 17.

In FIG. 1, 19a denotes a sliding cylinder, the cylinder axis of which runs coaxially relative to the inner bore of the probe tube 1, the diameter of the sliding cylinder 19a being just so much smaller than the diameter of the inner bore that the sliding cylinder 19a, although being displaceable in an axially guided manner, does not, in any thermal state, come into jamming connection with the probe tube 1 due to different coefficients of expansion.

In the center, the sliding cylinder 19a is provided, perpendicularly to its cylinder axis, with a throughflow duct 21a. The protective tube 18a welded to the perforated disk 16 is likewise welded at its lower end to the sliding cylinder 19a, the protective tube 18a opening into the throughflow duct 21a of the sliding cylinder 19a. The sliding cylinder 19a is thus connected directly to the perforated disk 16 by means of protective tube 18a. Thermally induced stresses between a sliding cylinder 19a and the probe tube 1 are avoided by means of this arrangement.

On each of the two sides of the throughflow duct 21a, the sliding cylinder 19a has, parallel to its cylinder axis, a bore 20 through which a protective tube 18b,c is loosely guided in each case. Below the sliding cylinder 19a, the protective tube 18b is bent relative to the cylinder axis of the sliding cylinder 19b and is welded to this sliding cylinder 19b, the protective tube 18b opening into a throughflow duct 21b.

The protective tube 18c is guided through a bore of the sliding cylinder 19b according to the above description, below the sliding cylinder 19b is bent relative to the cylinder axis of the sliding cylinder 19c and is welded to the latter, the protective tube 18c opening into a throughflow duct 21c.

A thermocouple 22 is arranged in a guided manner in each of the protective tubes 18a,b,c, the connecting points 23 of said thermocouples being arranged in the throughflow ducts 21a,b,c.

FIG. 3, by the example of a section through the sliding cylinder 19a, illustrates the position of the connecting point 23 in the throughflow duct 21a.

This throughflow duct 21a opens into a throughflow duct 24 of the probe tube 1, the throughflow duct 24 of the probe tube 1 and the throughflow duct 21 of the sliding cylinder 19a being arranged in alignment with one another in the direction of flow 25 of the hot gas.

The design of the temperature probe above the perforated disk 16 braced in the cooling tube 2 is described below once again with reference to FIG. 1. This is therefore the part of the temperature probe which does not project into the hot-gas stream of the waste-gas diffusor.

A tube bushing 6 is screwed between the cooling tube 2, which is provided on its circumference with a number of cooling ribs 3, and an adapter 9. The adapter 9 is provided on the inside with a radial contraction 9a. Braced between this contraction 9a and the contraction 2a of the cooling tube 2 is a sealing cylinder 7 which consists of an elastic, thermally stable plastic and which has three bores 8. The thermocouples 22 are guided through these bores 8. When the tube bushing 6 is screwed to the cooling tube 2 and to the adapter 9, the sealing cylinder 7 is compressed between the contractions 9a and 2a in such a way that the thermocouples 22 are clamped in a gastight manner in the bores 8. This gastight fixing is the only fastening for the thermocouple 22 in the temperature probe. The thermocouples are otherwise arranged in a merely guided manner in the protective tubes 18a,b,c. Consequently, no mechanical stresses due to differing thermal expansion of the components comprising the temperature probe can be transmitted to the thermocouples.

In the adapter 9, each thermocouple 22 is connected to a line 12 via a direct connection 11. To cool this direct connection 11, the adapter 9 is provided with a number of cooling ports 10. In a terminal box 14 which is connected to the adapter 9, the lines 12 are connected to an extension cable 13 which makes the connection to a temperature measurement system not shown here.

The simple arrangement and fixing of the thermocouples 22 makes it possible, if required, to exchange such a thermocouple 22 on an installed temperature probe. For this purpose, only the screwed tube bushing 6 needs to be slacked, with the result that the clamping in the sealing cylinder 7 diminishes and releases the thermocouples. The thermocouple to be exchanged can then be extracted from a closable orifice, not shown here, in the terminal box 14. Since the bores 8 in the sealing cylinder 7 and the bores 17 in the perforated disk 16 are oriented in alignment, a replacement thermocouple can then be installed in the temperature probe in a simple way.

Of course, the invention is not restricted to the exemplary embodiment shown and described.

Thus, neither the number of installed thermocouples in the sliding cylinder is restricted to one, nor is the number of thermocouples in the exemplary embodiment represented here restricted to three.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A temperature probe, in particular for use in the waste-gas diffusor of a gas turbine, comprising:
    a probe tube for projecting into the hot-gas region of the waste-gas diffusor and having an inner bore running in a direction of a tube axis of the probe tube, the probe tube being provided over its length with a number of throughflow ducts running transversely relative to the tube axis,
    a number of thermocouples having connecting points which are arranged in the throughflow ducts, and
    a terminal box, in which the thermocouples are connected to a compensating line,
    wherein each said thermocouple is arranged in a solely heat-movably guided manner in a protective tube which is fixed relative to the inner bore of the probe tube.

2. The temperature probe as claimed in claim 1, wherein at least one sliding cylinder is fixed to at least one protective tube, and the sliding cylinder is arranged in a guided manner in this probe tube with its cylinder axis coaxial relative to the tube axis of the probe tube.

3. The temperature probe as claimed in claim 2, wherein each sliding cylinder has at least one throughflow duct which is oriented transversely relative to the tube axis of the probe tube and which is arranged in alignment with a throughflow duct of the probe tube, and wherein the connecting point of at least one thermocouple is arranged in the throughflow duct of the sliding cylinder.

4. A temperature probe comprising:
    a probe tube having an inner bore running in a direction of a longitudinal axis of the probe tube, said probe tube including a plurality of throughflow ducts running transversely relative to the longitudinal axis,
    a plurality of thermocouples, each said thermocouple having a connecting point arranged in alignment with the throughflow ducts of said probe tube,
    wherein each said thermocouple is arranged in a protective tube which is fixed relative to the inner bore of the probe tube.

5. A temperature probe comprising:
    a probe tube having an inner bore running in a direction of a longitudinal axis of the probe tube, said probe tube including a plurality of throughflow ducts running transversely relative to the longitudinal axis, at least one thermocouple, each said thermocouple having a connecting point arranged in alignment with the throughflow ducts of said probe tube, at least one sliding cylinder slidingly arranged within said inner bore of the probe tube, at least one protective tube fixedly attached to said at least one sliding cylinder, a longitudinal axis of said at least one protective tube being coaxial with said longitudinal axis of the probe tube, wherein said at least one thermocouple is disposed within said at least one protective tube.

6. The temperature probe as claimed in claim 5, wherein said at least one sliding cylinder includes a throughflow duct.

7. The temperature probe as claimed in claim 6, wherein said throughflow duct of said at least one sliding cylinder is aligned with said throughflow duct of said probe tube.

8. The temperature probe as claimed in claim 7, wherein said connecting point of said at least one thermocouple is arranged in alignment with said throughflow duct of said at least one sliding cylinder.

* * * * *